UNITED STATES PATENT OFFICE.

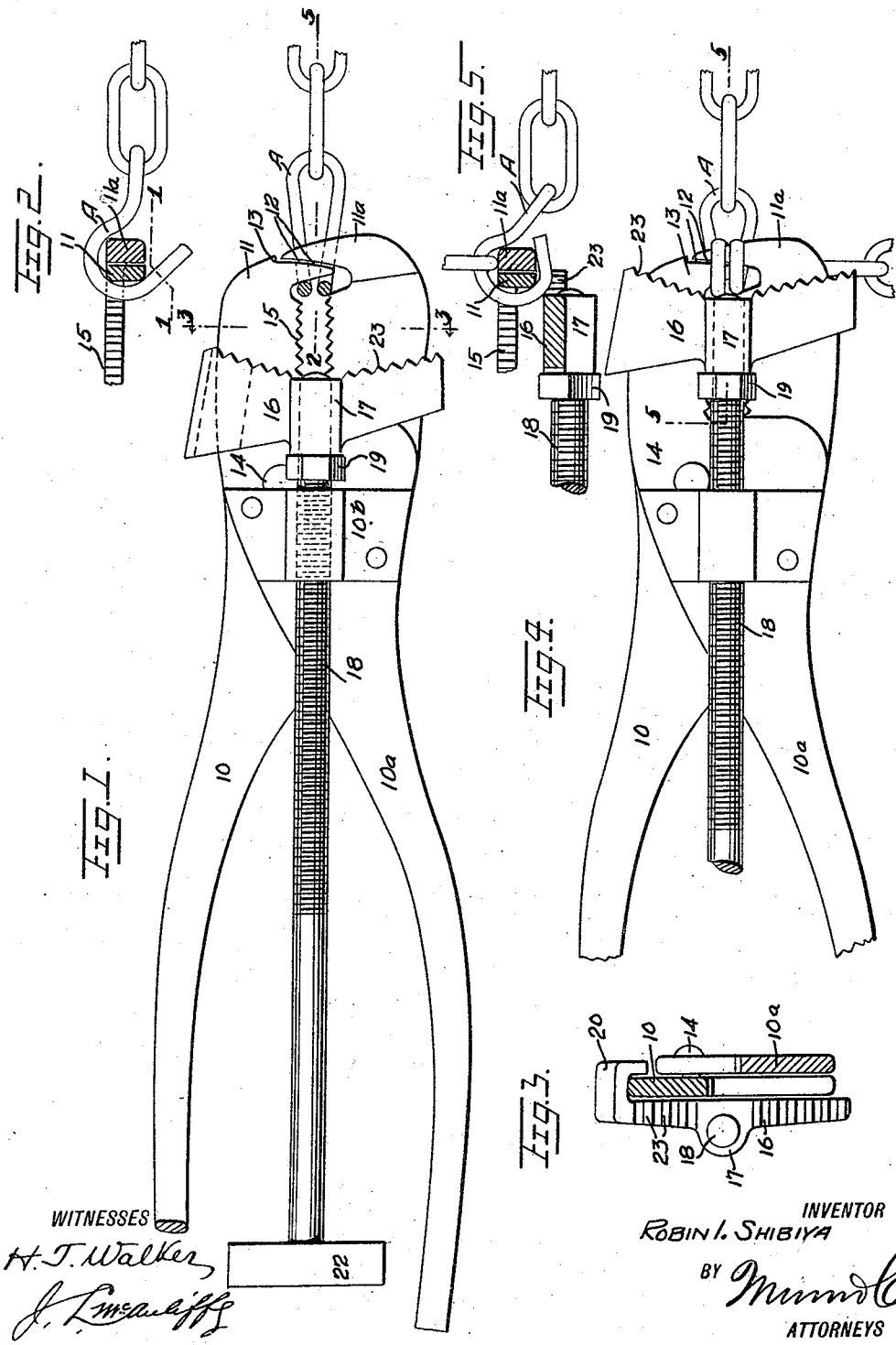

ROBIN ICH SHIBIYA, OF OMAHA, NEBRASKA.

CHAIN PLIERS.

1,419,081. Specification of Letters Patent. Patented June 6, 1922.

Application filed April 9, 1921. Serial No. 459,829.

*To all whom it may concern:*

Be it known that I, ROBIN I. SHIBIYA, a citizen of Japan, and a resident of Omaha, in the county of Douglas and State of Nebraska, have invented a new and Improved Chain Pliers, of which the following is a description.

My invention relates to pliers for opening and closing chain links and more particularly is intended for use in placing or removing members on tire chains.

The general object of the invention is to provide a tool complete in itself for the necessary operations on a chain and without employing other tools and expedients such as is usually necessary with chain pliers as ordinarily made.

The distinctive features of the invention and its advantages will clearly appear as the description proceeds.

Reference is to be had to the accompanying drawings forming a part of this specification, it being understood that the drawings are merely illustrative of one example of the invention.

Figure 1 is a side elevation of a pliers embodying my invention adjusted for use in opening a chain link;

Figure 2 is a detail in longitudinal section as indicated by the line 2—2, Figure 1;

Figure 3 is a cross section on the line 3—3, Figure 1;

Figure 4 is a side elevation of the front portion of the pliers showing the same adjusted for closing the chain link;

Figure 5 is a section on the line 5—5, Figure 4;

In carrying out my invention in accordance with the illustrated example two handled members 10, $10^a$ are provided, said members terminating in overlapping inturned tapered members 11, $11^a$, the one passing within or beneath the other, said terminals presenting opposed bevelled surfaces 12 and the one member having a stop shoulder 13 for limiting the closing movement of the handled members. The elements 10, $10^a$ are suitably pivoted as by a rivet 14 and the opposed inner side edges of the elements in front of the pivot adjacent to the terminals 11, $11^a$ are toothed as at 15.

The lateral inturned terminals 11, $11^a$ are adapted to enter a chain link A from opposite sides for spreading the link, said terminals being tapered or wedge-shaped to exert a spreading action.

For closing the link I provide a transverse head 16 slidable forward and back relatively to the terminals 11, $11^a$, said head having a tubular central portion 17 swiveled to the forward end of a threaded rod 18 engaging internal threads in a fixed cross bar $10^b$ on one of the handle elements 10 or $10^a$. A set nut 19 is provided on the rod 18 to bear against the head 16 and steady the same while permitting the relative turning of said rod. At one side the cross head 16 is formed with a U-shaped flange 20 embracing the adjacent side edge of one element $10^a$ to guide said head in its longitudinal movements and prevent its turning with the turning of the actuating rod 18. The front edge 23 of the head 16 is toothed to prevent the link A from slipping. The rod 18 is provided at its rear end with a head or equivalent handle element 22.

With the described arrangement for the purpose of closing an open hook A as indicated in Figure 2, the terminals 11, $11^a$ are passed through the opposite sides of said link and the rod 18 is operated to move the cross head 16 forwardly against the open end of the link, thereby exerting pressure on the link and closing the same.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:—

1. A chain pliers having coacting terminals on the handled members thereof adapted to engage a chain link, a link-closing head movable longitudinally on the pliers toward or from said terminals and adapted to exert closing pressure on a link, and individually operated actuating means for said head.

2. A chain pliers having means at the front end thereof to hold a link, a link-closing head movable longitudinally of the pliers toward or from said means, said link extending in opposite directions from the medial plane of the pliers and having a member in guided engagement with one of the handled members of the pliers, and the front edge of said head having teeth to prevent the link from slipping, and actuating means for said head.

3. A chain pliers having link-holding means on the front end thereof, a link-closing head movable longitudinally of the pliers and having guided engagement therewith, and an actuating screw to which said head is swivelled.

4. A pliers including means to hold a chain link, and a link-closing head provided with bent jaws movable longitudinally toward or from the link-holding means and adapted to exert closing pressure externally on the link.

5. A chain pliers including handled members having the terminals thereof directed laterally inward and tapered for opening a link by exerting a wedging action thereon, the one terminal lying beyond and overlapping the other terminal and manually operated means attached to said pliers independently movable toward and away from said terminals.

6. A chain pliers including handled members having the terminals thereof directed laterally inward and tapered for opening a link by exerting a wedging action thereon, the one terminal lying beyond and overlapping the other terminal, one of said terminals having a shoulder disposed toward the other terminal and against which the end of the latter will engage for limiting the movement of the terminals toward each other and manually operated means attached to said pliers independently movable toward and away from said terminals.

ROBIN ICH SHIBIYA.